United States Patent [19]
Fisher

[11] 3,752,283
[45] Aug. 14, 1973

[54] POSITIVE LOCKING CLUTCH SHIFT MECHANISM

[75] Inventor: Allen J. Fisher, Fort Wayne, Ind.

[73] Assignee: International Harvester Company, Chicago, Ill.

[22] Filed: Jan. 21, 1972

[21] Appl. No.: 219,804

[52] U.S. Cl.............. 192/99 S, 74/110, 192/93 R, 192/89 R, 192/108
[51] Int. Cl............................................ F16d 11/00
[58] Field of Search.............. 192/93 R, 89 R, 89 A, 192/99 R, 99 S, 67 R, 70.24

[56] References Cited
UNITED STATES PATENTS

| | | | |
|---|---|---|---|
| 2,129,361 | 9/1938 | Ruesenberg et al. | 192/70.24 |
| 1,540,247 | 6/1925 | Bowman | 192/99 S X |
| 2,146,880 | 2/1939 | Baker et al. | 192/70.24 X |
| 2,485,878 | 10/1949 | Hanlon | 192/93 R |

*Primary Examiner*—Benjamin W. Wyche
*Attorney*—Floyd B. Harman

[57] ABSTRACT

An actuating mechanism for a positively engaging clutch including a pair of balanced clutch actuating cranks, a pair of interconnected crank levers connected to the cranks, and a unitary mounting and guide plate effective to cause the cranks to turn in unison when actuated by a suitable mechanical linkage. The clutch actuating cranks are so disposed when engaged as to present a moment arm of zero length to any axial force tending to cause clutch disengagement. A detent spring is also provided which acts on one of the lever arms and is effective to positively hold the actuating mechanism in either a totally engaged or a totally disengaged position.

12 Claims, 8 Drawing Figures

Patented Aug. 14, 1973

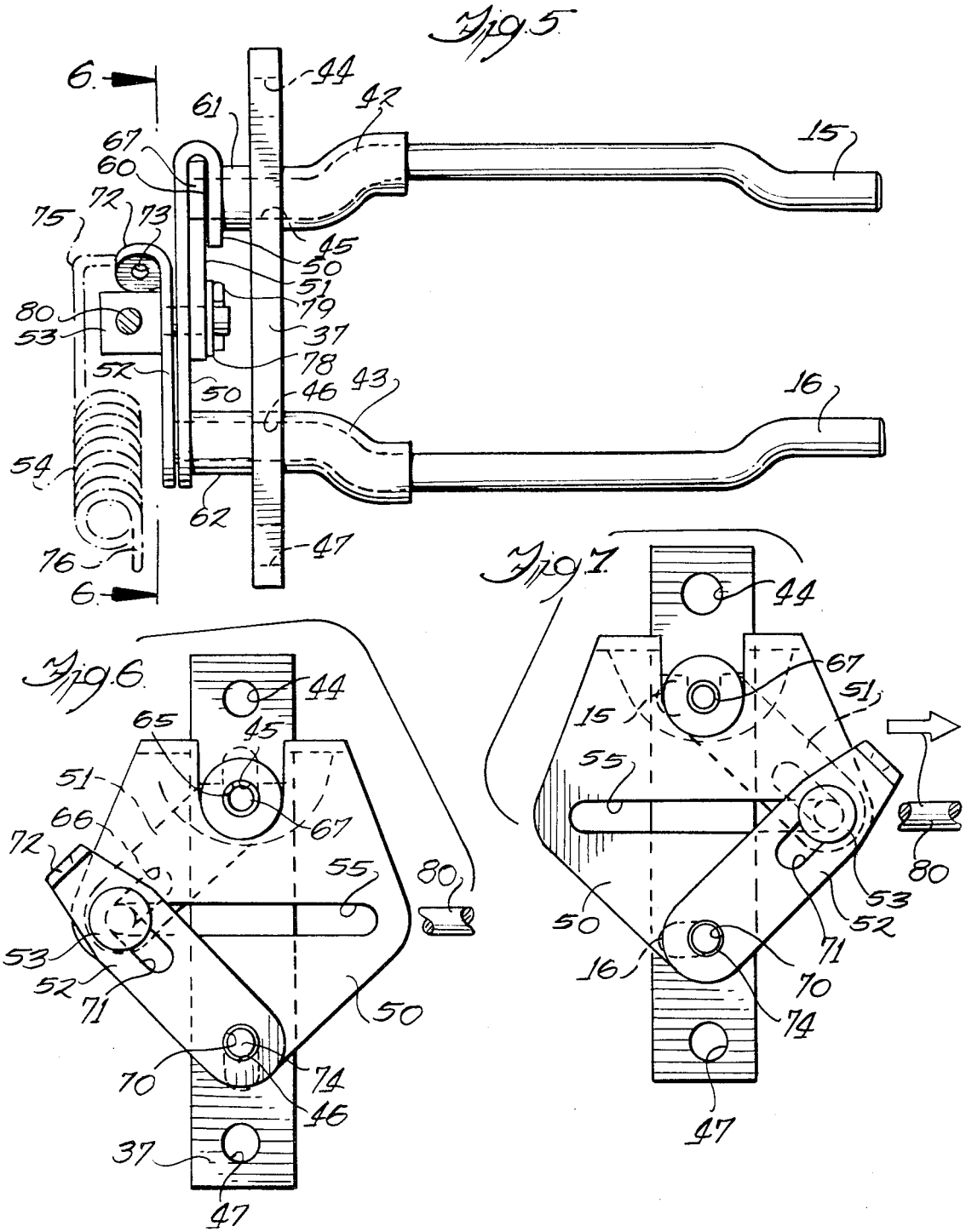

POSITIVE LOCKING CLUTCH SHIFT MECHANISM

BACKGROUND OF THE INVENTION

This invention relates to mechanisms for positively locking a clutch in either an engaged or disengaged position.

A variety of positive clutch engaging and disengaging mechanisms are known in the art, each of which has its limitations as to effectiveness, ease of operation, and cost of production.

In the sliding gear type of clutch which has a relatively long tooth contact area, the side loading on the teeth make intentional disengagement under load virtually impossible.

In the sliding gear type with relatively short tooth contact area, there may be a tendency for the gears to walk out under load, leading to undesired disengagement.

In some clutch engaging mechanisms where there is only one actuating element, there is a tendency for the clutch to bind due to the torque acting on only one side of the drive axis.

In clutches where there is a tendency to walk out, such condition is often prevented by providing heavily spring loaded detents to resist such tendency. Building in sufficient resistance in the detent springs to overcome such tendency requires that large manual forces be applied to effect engagement or disengagement.

SUMMARY OF THE INVENTION

It is an object of the present invention to provide a simplified, balanced shift mechanism for a positively engaging clutch that is lower in cost, easier to manufacture, and easier to assemble than devices heretofore known for this purpose.

It is another object to provide a clutch shift mechanism that is actuated for either engagement or disengagement with very light manual effort, but that still provides the operator with a positive feel of actuation.

It is a more particular object to employ a pair of shift cranks balanced about a center of motion and effective when engaged to present a moment arm of zero length to any axial forces tending to cause disengagement.

BRIEF DESCRIPTION OF THE DRAWINGS

FIG. 4 is a perspective view of the clutch shift shoe;

FIG. 5 is a disassembled view of the clutch shift shoe actuating cranks and shift mechanism;

FIG. 6 is a side view of the shift mechanism taken on line 6—6 of FIG. 5 shown in a clutch disengaged position;

FIG. 7 is a side view of the shift mechanism in a clutch engaged position; and

FIG. 8 is a side view of the pin guide plate of the shift mechanism.

DETAILED DESCRIPTION OF THE DRAWINGS

Figure 1:
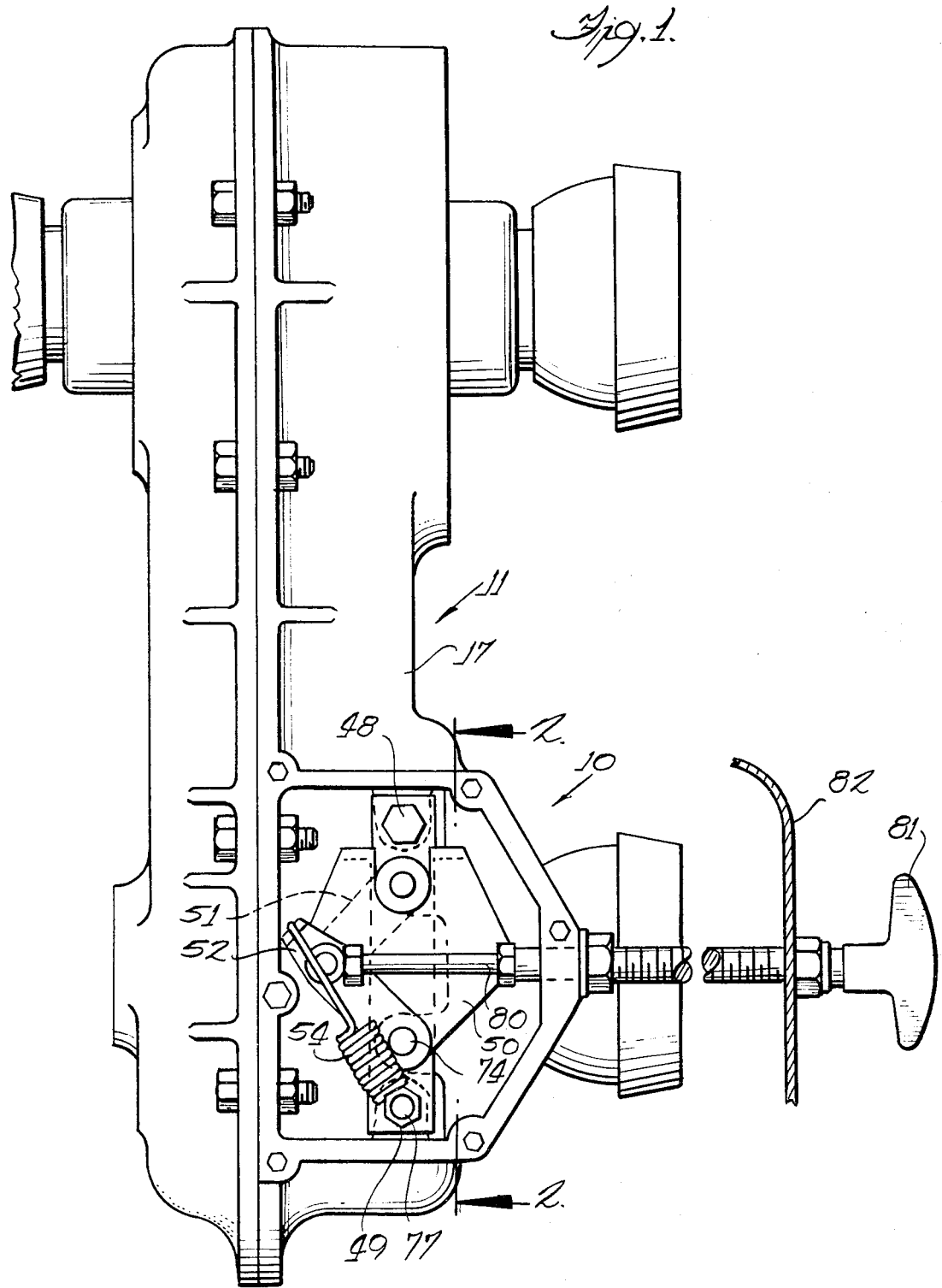
FIG. 1 is an external view of the chain drive transfer case and positive locking clutch shift mechanism of the present invention.
Figure 2:
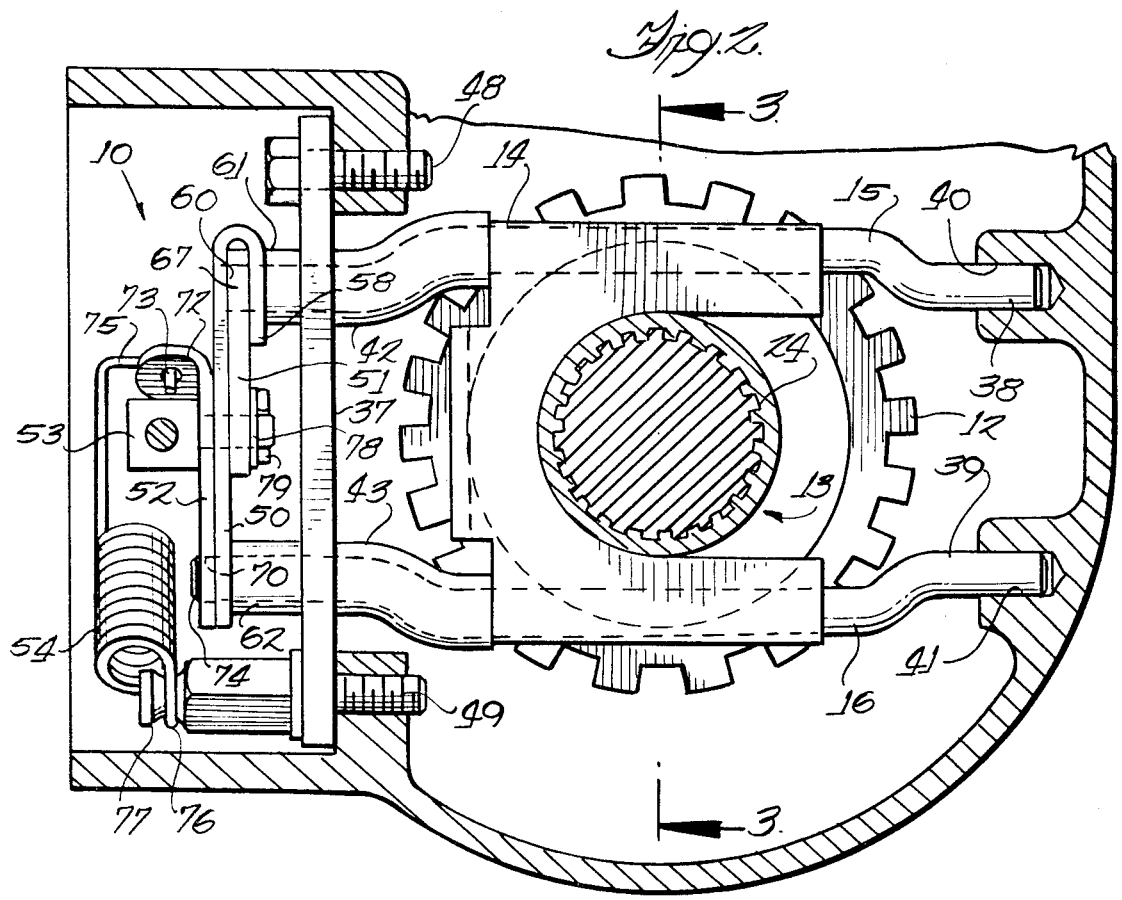
FIG. 2 is a sectional end view of the transfer case taken on line 2—2 of FIG. 1.
Figure 3:
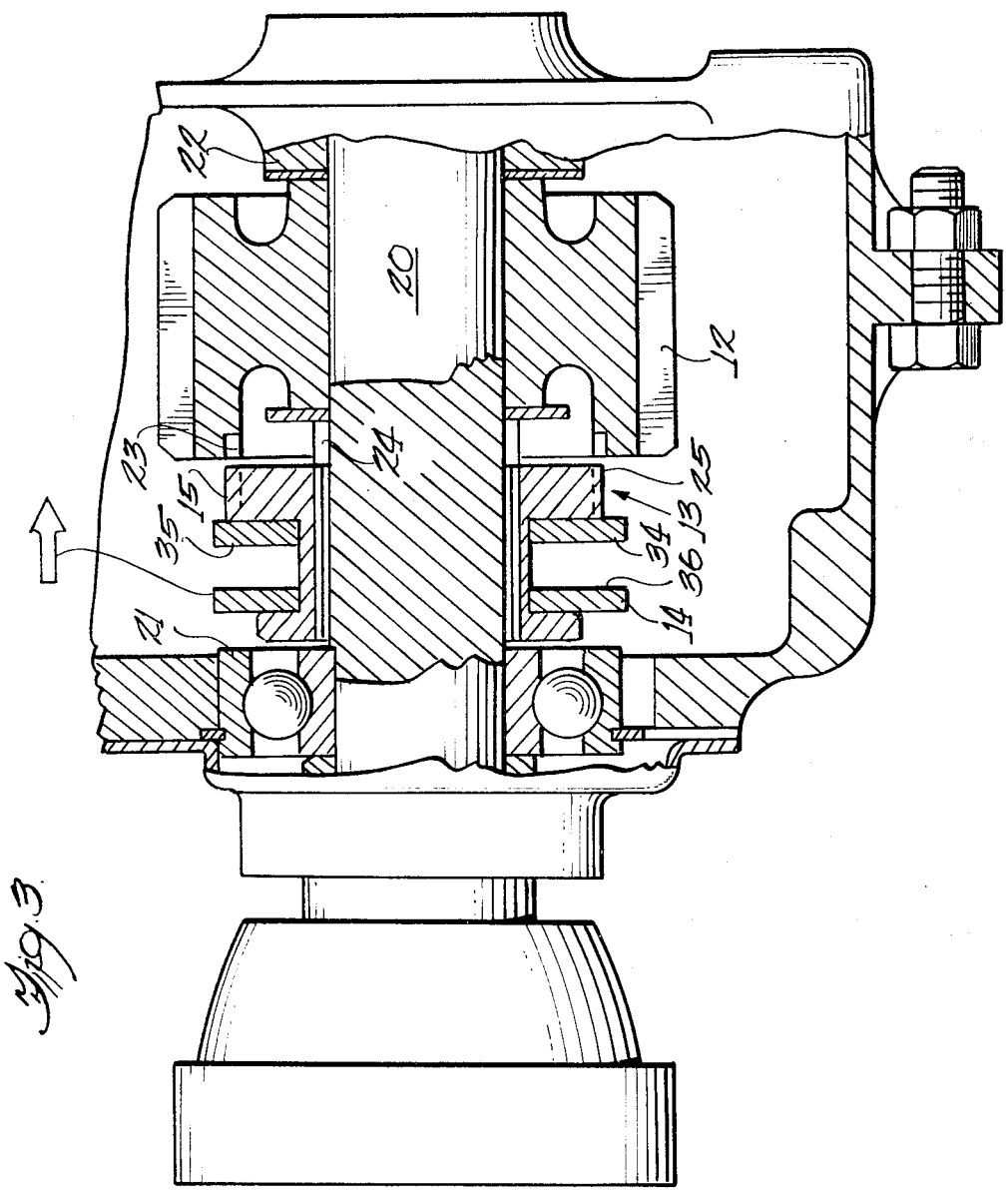
FIG. 3 is a fragmentary longitudinal section taken on line 3—3 of FIG. 2.

The positive locking clutch shift mechanism of the present invention is designated by the numeral 10 and is adapted to be used with a chain drive transfer case 11. The transfer case 11 is utilized in the power train of an automotive vehicle and comprises a drive sprocket 12, a positively engaging spline or jaw clutch 13, a clutch shift shoe 14, and a pair of clutch shoe actuating cranks 15 and 16, all contained within a housing 17.

A drive shaft 20 extends through the housing 17 and is supported by ball bearings 21 and 22. The drive sprocket 12 is rotatably mounted on the drive shaft 20 and is formed at 23 with internal gear teeth or splines. The clutch 13 is splined to the shaft 20 at 24 and can slide longitudinally thereon and is formed with external gear teeth or splines 25 adapted to engage the internal gear teeth 23 of the sprocket 12.

The shift shoe 14 is a unitary, generally "U" shaped member, folded into two opposed halves 28 and 29, and having arms 30 and 31, and 32 and 33, respectively, which engage an annular groove 34 formed in the clutch 13. The space between the two halves 28 and 29 define two crank engaging slots 35 and 36.

The clutch shoe cranks 15 and 16 are in the form of elongated eccentric rods which engage the slots 35 and 36, respectively, and are supported at one end by a mounting plate or bracket 37. The other free ends 38 and 39 of the cranks are journaled within circular wells 40 and 41 formed on the interior of the housing 17. The cranks 15 and 16 carry spacer sleeves 42 and 43, respectively, disposed between the bracket 37 and shift shoe 14. The disposition of the cranks 15 and 16 on opposite sides of the shaft 20 provides for balanced actuating forces on the shift shoe 14 to cause longitudinal sliding of the clutch 13 without binding.

The mounting plate 37 is an element of the shift mechanism 10 and is in the form of an elongated, flat metal strip formed with holes 44, 45, 46 and 47. The holes 44 and 47 receive mounting bolts 48 and 49 for attaching the plate 37 to the housing 17. The shift mechanism 10 also comprises a pin guide plate 50, crank levers 51 and 52, a cable end pin 53, and a spring 54. The pin guide plate 50 is formed with an elongated slot 55 in which the pin 53 slides, a hole 56 for loosely receiving the crank shaft 16, and an enlarged aperture 57. The plate 50 is folded over through the aperture 57 to form a flange 58 parallel to the surface of plate 50. The flange 58 is formed with an elongated semicircular slot 59 for receiving and cradling the end of the crank 15. The flange 58 and plate 50 define a guide channel 60 between their surfaces and the crank lever 51 is retained within this channel 60. Cylindrical metal spacers 61 and 62 surround the crank shafts 15 and 16, respectively, and are disposed between the plate 37 and the flange 58, and guide plate 50, respectively.

The crank lever 51 is in the form of an elongated flat strip and is formed with a circular hole 65 near one end, and an elongated slot 66 near the other end. The hole 65 receives an end 67 of the crank 15 and the crank end is welded or otherwise rigidly attached to the lever 51. The slot 66 receives the cable end pin 53.

The crank lever 52 is similar to the lever 51 and is formed with a hole 70 and elongated slot 71. The lever 52 in addition is formed with a right angle flange 72 formed with a hole 73. The hole 70 receives an end 74 of the crank 16 and the crank end is welded to the lever 52. The slot 71 receives the pin 53 also. The hole 73 receives one end 75 of the spring 54. The other end 76 of the spring 54 is attached to a stud extension 77 of the bolt 49.

The shank of the cable end pin 53 extends in succession through slot 71, slot 55, and slot 66 and is retained by a washer 78 and cotter pin 79. One end of a control cable 80 is attached to the head of the pin 53. A manual control handle or knob 81 is attached to the other end of the cable 80 and is mounted at a convenient location on the dashboard 82 of the vehicle. The shift mechanism 10 and cranks 15 and 16 are assembled as a unit prior to mounting on the transfer case 11.

The clutch shift mechanism 10 is shown in a disengaged position in FIGS. 1 and 6. The engagement of the clutch 13 with the sprocket 12 is accomplished by pulling on the control knob 81 and moving the mechanism 10 into the position shown in FIG. 7. Disengagement of the clutch 13 is accomplished by pushing the control knob 81 back to its original position of FIG. 1.

The motion of the control knob 81 for engagement is transmitted through cable 80 to the pin 53. The pin 53 is caused to move to the right as shown in FIG. 6 sliding in the slot 55. The crank levers 51 and 52 are caused to swing together in unison, foreshortening the effective length of the lever arms, with the pin 53 sliding in the slots 66 and 71. The total angular motion of the levers 51 and 52 for engagement is approximately 90°, or 45° on each side of a vertical axis.

It should be noted that the pivot point for the lever 52 is the end 74 of the crank 16. The stud extension 77 for the spring 54 is mounted at a point some distance below the end 74. By geometry, the positions of minimum extension of the spring 54 are at the limits of motion (at the ends of slot 55) for total engagement or disengagement as shown in FIGS. 7 and 6. This means that the spring 54 is elongated under increased tension during the time engagement or disengagement is taking place providing a positive feel to the hand of the operator.

The turning motion of the levers 51 and 52 during engagement is transmitted through cranks 15 and 16, moving them to the substantially horizontal positions shown in FIG. 7. The motion of the cranks 15 and 16 is transmitted through the shift shoe 14 sliding the clutch 13 and bringing the gear teeth 25 into engagement with the teeth 23. The extent of motion for engagement and disengagement of the clutch is the effective moment arm of the cranks 15 and 16 and need be only about one-quarter inch. This limited engagement of the gear teeth 25 and 23 minimizes side loading on these teeth and permits disengagement of the clutch 13 under load, if desired. Any tendency of the gear teeth 25 and 23 to pop-out or walk-out is minimized by the fact that the cranks 15 and 16 are in a nearly horizontal position presenting moment arms of zero length. Thus any longitudinal force tending to disengage these teeth 23 and 25 will be transmitted directly through the cranks 15 and 16 and absorbed by the housing 17. Any slight misalignment of these cranks or of the forces tending to cause disengagement is absorbed by the detent spring 54. The mechanical advantage of the mechanism 10 to effect disengagement thus is nearly infinite.

While a preferred embodiment of the invention has been specifically disclosed, it is to be understood that the invention is not limited thereto as other variations will be readily apparent to those skilled in the art and the invention is to be given its fullest possible interpretation within the terms of the following claims.

I claim:
1. In a clutch shifting mechanism for a positive clutch adapted to engage a driving and a driven element on a common shaft the combination comprising:
  a longitudinally movable clutch member;
  a clutch shift shoe operatively associated with and adapted to move said clutch member;
  a pair of eccentric crank arms disposed on opposite sides of the shaft and extending transversely thereto, said crank arms being operatively associated with said clutch shift shoe and effective when rotated to cause longitudinal movement of said shift shoe and said clutch member, said crank arms being adapted to be rotatably supported in a housing in which said shifting mechanism is disposed;
  a pair of crank levers each having one end connected to one of said crank arms and operable to rotate said crank arms;
  means interconnecting said crank levers whereby motion applied to said interconnecting means is effective to rotate said crank levers and crank arms in unison;
  a guide plate formed with a motion defining groove, said guide plate being mounted adjacent said crank levers, and
  said interconnecting means including a unitary guide element joining said crank levers and constrained to move in said groove.

2. In a clutch shifting mechanism for a positive clutch adapted to engage a driving and a driven element on a common shaft the combination comprising:
  a longitudinally movable clutch member;
  a clutch shift shoe operatively associated with and adapted to move said clutch member;
  a pair of eccentric crank arms disposed on opposite sides of the shaft and extending transversely thereto, said crank arms being operatively associated with said clutch shift shoe and effective when rotated to cause longitudinal movement of said shift shoe and said clutch member, said crank arms being adapted to be rotatably supported in a housing in which said shifting mechanism is disposed;
  a pair of crank levers each having one end connected to one of said crank arms and operable to rotate said crank arms;
  means interconnecting said crank levers whereby motion applied to said interconnecting means is effective to rotate said crank levers and crank arms in unison;
  a guide plate formed with a linear motion defining slot, said guide plate being mounted adjacent said crank levers,
  said interconnecting means comprising a guide pin extending through the free movable ends of said crank levers and through said slot in said guide plate, said guide pin being constrained to move through the length of said motion defining slot; and
  a manually actuated linkage connected to said guide pin and effective when actuated to cause engagement and disengagement of the clutch.

3. The combination of claim 2 wherein
  each of said crank levers is formed with a longitudinal slot for receiving said guide pin and effective to allow longitudinal motion of said guide pin within said crank lever slots during the rotating motion of said crank levers between engaged and disengaged positions of the clutch.

4. The combination of claim 3 including
a detent spring attached to one of said crank levers and effective to yieldably hold said shifting mechanism in either a totally engaging or disengaging position.

5. A mechanism for actuating a clutch, the combination comprising:
a pair of spaced and parallel, rotatably supported shafts, each of said shafts being rotatable between first and second positions corresponding to the fully engaged and disengaged conditions, respectively, of the clutch; and
means for rotating said shafts in unison between their first and second positions including
a first lever arm rigidly attached to one of said shafts and formed with a longitudinal slot throughout a portion of its length;
a second lever arm rigidly attached to the other of said shafts and formed with a longitudinal slot throughout a portion of its length, and the combined length of said two arms being greater than the distance between the parallel shafts;
a guide plate mounted transversely to the axes of the shafts and parallel to the plane of rotation of said lever arms and formed with a linear motion defining groove located between and transverse to the axes of the shafts, said groove defining a limit of motion at either end thereof corresponding to the fully engaged and disengaged conditions of the clutch;
a guide pin extending transversely through said slots in said lever arms and through said motion defining groove; and
motion transmitting means connected to said guide pin and effective to cause said pin to move longitudinally between said limits of motion and rotate said shafts between their first and second positions.

6. A mechanism of claim 8 including:
resilient means yieldably urging said shafts to their first and second positions including
a tension coil spring having an end portion attached to one of said lever arms so as to be movable therewith and its opposite end attached to a relatively fixed part of the mechanism at a point substantially disposed in a plane containing the rotational axes of said shafts.

7. The actuating mechanism of claim 6 wherein said motion transmitting means includes:
a manually actuated, longitudinally movable linkage attached to said guide pin and operable to move said pin between said limits of motion and rotate said shafts between their first and second positions and wherein said spring is effective to yieldably hold said pin at both of its limits of motion.

8. A clutch actuating means for effecting engagement and disengagement of drive and driven clutch elements of a clutch upon axial movement of one of said clutch elements with respect to the other one of said clutch elements, the combination including said clutch elements, comprising:
a pair of spaced and parallel shafts operatively connected to said relatively movable element for moving said clutch element axially to effect engagement and disengagement of the clutch upon rotation thereof between first and second positions corresponding respectively to the engaged and disengaged conditions of the clutch;
means for rotating said shafts in unison between their first and second positions including
a pair of crank levers, one end of each of said crank levers being fixedly connected to a respective one of said shafts whereby swinging of said crank levers effects rotation of said shafts, the opposite end portions of said crank levers being arranged side-by-side,
single pin means, said single pin means being movable substantially in a linear path substantially perpendicular to the plane containing the rotational axes of said shafts, and
means operatively connecting each of said crank lever opposite end portions and said single pin means whereby movement of said single pin means in said linear path effects simultaneous swinging of said crank levers, and
guide means supported by said shafts and disposed adjacent said crank lever opposite end portions for restraining said single pin means to move in said linear path, said guide means also being effective to limit the length of said linear movement path.

9. A clutch actuating means as set forth in claim 8, further including:
manually operable means for effecting movement of said single pin means in said linear path from a location remote therefrom.

10. A clutch actuating means as set forth in claim 9, wherein said guide means includes a plate-like portion disposed substantially in a plane closely spaced and parallel to the planes containing said crank levers, said plate-like portion being provided with an elongated slot therethrough defining said linear movement path, and said single pin means extends through and is slidable within said slot; and resilient means yieldably urging said pin means toward the longitudinal ends of said slot.

11. A clutch actuating means as set forth in claim 10, wherein said means operatively connecting each of said crank lever opposite end portions and said single pin means includes an elongated slot formed through each of said opposite end portions and extending longitudinally with respect to the crank lever with which it is associated; and
said single pin means includes a cylindrical pin extending through both of said opposite end portion slots and said guide means plate-like portion slot, the longitudinal axis of said cylindrical pin being substantially parallel with respect to the rotational axes of said shafts.

12. A clutch actuating means as set forth in claim 11, wherein said resilient means includes
a helically-wound tension spring having one attached to one of said crank levers adjacent said opposite end portion thereof and its opposite end attached to a relatively fixed part of the clutch actuating means at a point substantially lying in a plane containing the rotational axes of said shafts.

* * * * *